(12) United States Patent
Eu

(10) Patent No.: US 7,583,931 B2
(45) Date of Patent: *Sep. 1, 2009

(54) ANIMAL IDENTIFICATION AND ENTRY CONTROL SYSTEM

(76) Inventor: Philip Stephen Eu, 224 E. 52 St., New York, NY (US) 10022

( * ) Notice: Subject to any disclaimer, the term of this patent is extended or adjusted under 35 U.S.C. 154(b) by 363 days.

This patent is subject to a terminal disclaimer.

(21) Appl. No.: 11/123,583

(22) Filed: May 7, 2005

(65) Prior Publication Data

US 2006/0252366 A1 Nov. 9, 2006

(51) Int. Cl.
H04B 7/00 (2006.01)
(52) U.S. Cl. .................. 455/41.2; 455/78; 455/67.11; 455/404.2
(58) Field of Classification Search ............ 455/3.06, 455/456.1, 436, 444, 456.2, 456.3, 456.5, 455/456.6, 457, 435.1, 41.1–3, 404.2, 418, 455/515, 67.11, 575.8, 575.1, 78, 511, 70, 455/411; 340/539.1, 573.2, 5.62; 119/51.01–51.02, 119/484, 163
See application file for complete search history.

(56) References Cited

U.S. PATENT DOCUMENTS

| | | | | |
|---|---|---|---|---|
| 2,836,150 | A | * | 5/1958 | Robinson .................. 119/53 |
| 3,260,034 | A | | 7/1966 | Major |
| 3,465,724 | A | | 9/1969 | Broadbent |
| 3,557,757 | A | | 1/1971 | Brooks |
| 3,557,758 | A | | 1/1971 | Lack |
| 3,897,753 | A | | 8/1975 | Lee et al. |
| 4,022,263 | A | * | 5/1977 | Beckett et al. .............. 119/501 |
| 4,036,178 | A | | 7/1977 | Lee et al. |
| 4,162,683 | A | | 7/1979 | Brooks |
| 4,188,912 | A | | 2/1980 | Smalley |
| 4,216,743 | A | | 8/1980 | Cohen |
| 4,461,241 | A | | 7/1984 | Ostler |
| 4,463,706 | A | | 8/1984 | Meister et al. |
| 4,497,133 | A | | 2/1985 | Blenkinsop |
| 4,517,923 | A | | 5/1985 | Palmer |
| 4,572,108 | A | | 2/1986 | Daifotes |
| 4,655,170 | A | | 4/1987 | DaSilva |
| 4,798,175 | A | | 1/1989 | Townsend et al. |

(Continued)

FOREIGN PATENT DOCUMENTS

GB 1576318 6/1993

(Continued)

*Primary Examiner*—John J Lee
(74) *Attorney, Agent, or Firm*—Scott Lefton

(57) ABSTRACT

There is disclosed an animal identification and entry control system based on a radio frequency identification (RFID) system including an animal collar-mounted RFID tag, and RFID circuitry including a single antenna housed within a bezel placed forward of and surrounding the entry aperture to optimize signal reception. The bezel shape allows only one animal to enter at a time. To conserve power, the circuitry is only activated when an animal pushes against a door within the device, triggering a switch mechanism. A circuit-controlled latch prevents animals from opening the door unless a code match is detected between the programmed code in the tag and a stored code in the circuit controlling the system. Multiple codes may be stored for identifying multiple animals wearing collars tagged with unique identifying codes. The system's applications include but are not limited to controlling animal entry to feeding enclosures, human housing and animal housing.

22 Claims, 5 Drawing Sheets

U.S. PATENT DOCUMENTS

| | | |
|---|---|---|
| 4,991,350 A | 2/1991 | Kirk |
| 5,177,900 A | 1/1993 | Soloweij |
| 5,482,008 A * | 1/1996 | Stafford et al. .............. 119/174 |
| 5,669,328 A | 9/1997 | Lanfranchi |
| 5,701,702 A | 12/1997 | Reid et al. |
| 5,826,538 A | 10/1998 | Roybal |
| 5,992,096 A | 11/1999 | De La Cerda et al. |
| 6,141,911 A | 11/2000 | Reid |
| 6,211,789 B1 * | 4/2001 | Oldham et al. ........... 340/573.3 |
| 6,329,918 B1 * | 12/2001 | Moyer ..................... 340/573.1 |
| 2005/0217591 A1 * | 10/2005 | Turner et al. .............. 119/51.02 |
| 2006/0125627 A1 * | 6/2006 | Gardner et al. ........... 340/539.1 |

FOREIGN PATENT DOCUMENTS

| | | |
|---|---|---|
| GB | 2305211 | 4/1997 |
| GB | 2393245 | 3/2004 |

* cited by examiner

ANIMAL IDENTIFICATION AND ENTRY CONTROL SYSTEM

CROSS REFERENCE TO RELATED APPLICATION

Animal identification and entry control system for feeding purposes application Ser. No. 11/123,731

STATEMENT REGARDING FEDERALLY SPONSORED RESEARCH OR DEVELOPMENT

N/A

BACKGROUND

The present invention relates generally to animal entry systems, and more specifically to a radio frequency identification (RFID) based system for controlling pet access to specific doorways and enclosed structures. The types of doorways used by pets include animal-sized entryways to human dwellings, animal dwellings, and feeding enclosures. It would be generally desirable for these entryways to have the capability to recognize and allow entry to specific animals and also to deny entry to all other animals. It would also be generally desirable for these entry systems to be easily taught or programmed to recognize specific animals, and to then operate independently, safely and reliably without the need for frequent maintenance including battery changes.

There are numerous pet access control systems in existence, many of which are capable of identifying one or more specific animals. Some of these access control systems identify the specific animals by using radio signals sent to and from suitably constructed identification collars, while others use identifying means including magnets or infra-red transmitters embedded in animal collars.

The non-radio-based animal identification systems uniformly suffer from range and orientation problems, where the magnetic based systems must have the magnet extremely close to the sensor to work. Infra-red systems require a clear line-of-sight, thus making reliable operation of infra-red based animal identification systems difficult.

The older radio-based animal identification systems were based on purely analog circuitry, and many of these systems were designed to excite an analog resonant circuit element worn by an animal and to detect the analog signal resulting from the excitation of this element. This type of circuit was dependent on the tuning of an oscillator and the tuning of the resonant element, and was also very sensitive to antenna orientation and distance, and as such was not robust. Aside from the difficulties in maintaining sufficient tuning accuracy, these systems required much more complex tuned circuitry in order to identify multiple specific animals. The circuits also were generally designed to run continuously, and as such were very power-inefficient.

One example of a purely analog circuit-based animal identification and entry control system is taught by U.S. Pat. No. 4,497,133 filed Feb. 5, 1995 entitled PET DOOR WITH CONTROL CIRCUIT THEREFOR which discloses a pet door with a control circuit whose ability to recognize a passive radio frequency ID element depends on the use of a specific resistor in the circuit. This resistor is sold along with the ID element that is used as a key tag worn by the pet. The requirement to install one specific resistor in the circuit to enable a specific oscillator frequency is a very limiting approach. This invention has no programmability other than by replacing circuit components, and no ability to recognize multiple ID elements. The invention does use a switch connected to the door to turn on the circuit when the door is pressed by an animal, thus providing operation only when necessary.

British Patent No. GB 2,305,211 filed Apr. 2, 1997 entitled Security Locking Circuit discloses a security locking circuit suitable for use with a door latch, with a passive tuned circuit functioning as the key responding to a release signal. The control system is based on a microprocessor and has the ability to learn and recognize multiple individual tuned circuits functioning as ID elements. The means for ID element characterization is dependent on the circuit characterizing and storing whatever resonant signal the ID element generates in response to the transmitted signal. This is a risky method, since there is no control on how well any one specific response signal can be differentiated from the signals generated by other tuned circuits functioning as ID elements. The invention does include power savings through the option of a sleep mode, where an animal pushing against the door would operate a microswitch that would turn the circuit on.

U.S. Pat. No. 5,992,096 filed Nov. 30, 1999 entitled CONTROLLABLE PET ACCESS SYSTEM teaches a controllable pet access system that uses one or more solenoids to unlock a pet door in response to a reader circuit scanning and receiving a signal from a passive ID element described only as an "encoded animal tag" or "encoded pet tag". This invention uses a motion detector to activate the reader circuit, thus requiring constant power for the motion detector. The invention is also lacking programmability or means to identify multiple ID elements.

The most common application for both the radio and non-radio-based animal identification systems is for animal feeders. The majority of the inventions in this field have been for use with livestock, where there are strong economic incentives for controlling feed distribution to each animal in a pasture or similar environment. Pet feeders are a smaller portion of this inventive field, with the primary motivation being convenience.

U.S. Pat. No. 3,465,724 filed Sep. 9, 1969 entitled RECORDING AND/OR CONTROL OF THE FEEDING OF LIVESTOCK and U.S. Pat. No. 3,557,758 filed Jan. 26, 1971 entitled ANIMAL IDENTIFICATION AND CONTROL MEANS both disclose feeding enclosures with access controlled by the interaction of an animal-carried passive tuned circuit ID element with a transformer-type oscillator circuit. Both of these inventions include the output and detection of multiple frequencies to allow for a group of individual ID elements. Both of these inventions use as ID elements tuned analog circuits that must match the output frequencies of the oscillator circuit, and further the location of the ID element on the body of the animal and in relation to the transmitting and receiving coils is critical to the proper function of each of these inventions. These inventions are not turned on by an animal interacting with them but run constantly, and are thus power-inefficient.

U.S. Pat. No. 3,897,753 filed Aug. 5, 1975 entitled MEANS AND METHOD FOR SELECTIVELY CONTROLLING ANIMALS discloses an animal feeder and entry control system which in the primarily illustrated embodiments are intended for use with domestic animals, particularly pet cats. This invention does include both a food dispenser (but not food enclosure) and an enclosure door unlocking function among its embodiments. However, the driver circuit taught by this invention depends on a tuned element's effect on what are effectively the coils of a transformer to produce a change in output and thus identify a specific ID element carried by an animal. The location of the ID element in relation to the receiving coil is critical to the proper function of this invention, but there is no explicit location control taught. Additionally, this invention runs constantly, and thus is power-inefficient. This invention does not teach the use of a microprocessor or other digital device to control frequency generation or other system functions, but does teach the use of multiple ID elements responding to individual excitation frequencies.

U.S. Pat. No. 4,036,178 filed Jul. 19, 1977 entitled ELECTRONIC LOCK AND KEY SYSTEM, a continuation-in-part of U.S. Pat. No. 3,897,753, teaches a more generalized approach to an entry control system, but uses the same inefficient signal generation and detection techniques as the parent patent.

U.S. Pat. No. 4,463,706 filed Aug. 7, 1984 entitled METHOD AND SYSTEM FOR MONITORING THE DISPENSING OF DRUGS OR NUTRIENTS TO ANIMALS discloses the use of passive radio frequency ID elements carried by the animals to identify individual animals. The ID element contains memory and countdown timer circuitry that is updated by a base radio unit with information as needed. However, much of the circuitry in the animal-carried portion of this invention is actually powered by a battery.

A significant improvement over the existing art would be an animal identification and entry control system that could accurately detect multiple specific animals and could be easily and quickly programmed to recognize other animals when necessary, was powered by batteries and only drew battery power when absolutely necessary, used low-power circuitry for a minimum of battery power drain when in active operation, was durable and weatherproof enough to be used outdoors, was capable of safely limiting access to a single animal at a time, and was adaptable to entry control for applications including but not limited to entry to a feeding enclosure, entry to a human dwelling, and entry to an animal dwelling.

SUMMARY

In accordance with the present invention, an RFID-based animal identification and entry control system is disclosed. This system is designed to be adaptable to any entry control application suitable for small to medium-sized animals, and is particularly well suited for use with domestic feline cats and small dogs.

The RFID portion of the system uses an RFID tag element suitable for use as a collar tag that may be attached to a, regular animal collar. Each separate tag element can be programmed with a unique code, and multiple codes may be programmed, stored and recognized by the RFID system. The means for programming included in the RFID portion of the system is designed to allow the rapid and simple teaching of multiple tag codes.

The RFID means used in the system described hereinafter includes a commercially available digital RFID system including the collar tag elements, each with an individual digital code programmed into the internal memory. A typical system of this type is the Texas Instruments Series 2000 Reader System, which is the preferred system for use with the present invention. Other typical control circuitry preferred for use with this invention includes a microcontroller such as the PIC16F876. The techniques of circuit design, antenna design, printed circuit board layout, integration, programming and general use of the RFID circuitry including the commercially available RFID system, microcontroller and other circuitry disclosed herein are well known to those skilled in the art.

The preferred means for RFID also consists of signal processing circuitry for initial processing of the incoming signal, a door control circuit including a sensing switch, a latch and a solenoid with driver circuitry, and the single antenna coil.

The means for allowing and denying access is a lockable door, configured to block an aperture formed as an animal-sized opening in a boundary surface such as a feeding enclosure, fence, wall or larger door. The preferred means for locking and unlocking the door and thus allowing an animal to pass through is a latch mechanism actuated by a solenoid operated by the control circuitry. The door is located at the end of an entryway defined by a bezel preferably dimensioned to allow only a single animal to enter at a time. The passage length of the bezel and thus of the entryway is preferably no greater than the body length of the general size of animal that the aperture is designed to accomodate. The first end of the entryway is at the aperture, and the second end of the entryway is where an animal initially enters the bezel. In the preferred embodiment, when the door is allowed to open, it does so by swinging upwards and inwards from pivots located at or near the top edge of the door. When the animal that has entered the entryway presses against the outer surface of the locked door, a switch connected to the door is activated, and this in turn serves to turn on the control circuit. This causes the circuitry to generate a signal through the antenna coil that will activate an appropriate RFID tag element if such is within range of the system, causing such an element to send an identifying return signal to be received by the antenna coil.

The antenna coil is preferably located in the bezel that surrounds the entryway, and is preferably shaped into a loop that encircles the inside of the bezel at some distance forward of the door. This serves to create an ideal location relationship between the RFID tag element and the antenna coil at the time when signals are most likely to be transmitted to the tag and then from the tag to the antenna coil. This loop is not necessarily round in shape, but it does need to be wider than both the aperture and the door, and fit inside the confines of the bezel.

If the return signal generated by the RFID tag element and then received by the antenna coil should match with one of the codes stored in the RFID circuitry, the door control circuit will be activated and the solenoid will open the door latch and allow the animal to push the door open and pass through the doorway. As soon as the animal has passed through the doorway, the door will pivot shut and latch closed again, preventing any other animals from entering unless they also possess a collar with a recognized RFID tag.

The power source for this entry control system may be batteries, a pluggable DC adapter or direct attachment to the local AC power.

In addition to the basic door function that may be used to control animal entry to both human and animal housing, the door function may be adapted to other purposes including to control animal entry to a feeding enclosure or any boundary surface such as a wall, fence or door.

For the entry control to operate autonomously with batteries as a power source, this requires electronics that have a very low power draw and that use power consumption strategies that minimize the length of time when any significant amount of power will actually be drawn. In this case the majority of the RFID circuitry is kept in a default state of minimum-power sleep mode, with a switch connected to the door signaling the circuitry to wake up into active mode when pressure against the door closes the switch contact. After a predetermined length of time without any switch closure, the circuitry will return to sleep mode, thus prolonging battery life.

BRIEF DESCRIPTION OF THE SEVERAL VIEWS OF THE DRAWINGS

A more complete understanding of the invention and its advantages will be apparent from the detailed description taken in conjunction with the accompanying drawings in which.

DETAILED DESCRIPTION

An animal identification and entry control system is provided that permits selected animals to gain entrance through a specific doorway, and bars entry to other animals. The presently disclosed entry control system may be used to control entrance to places including but not limited to an animal habitation, a human habitation, or an animal feeder.

Figure 1:
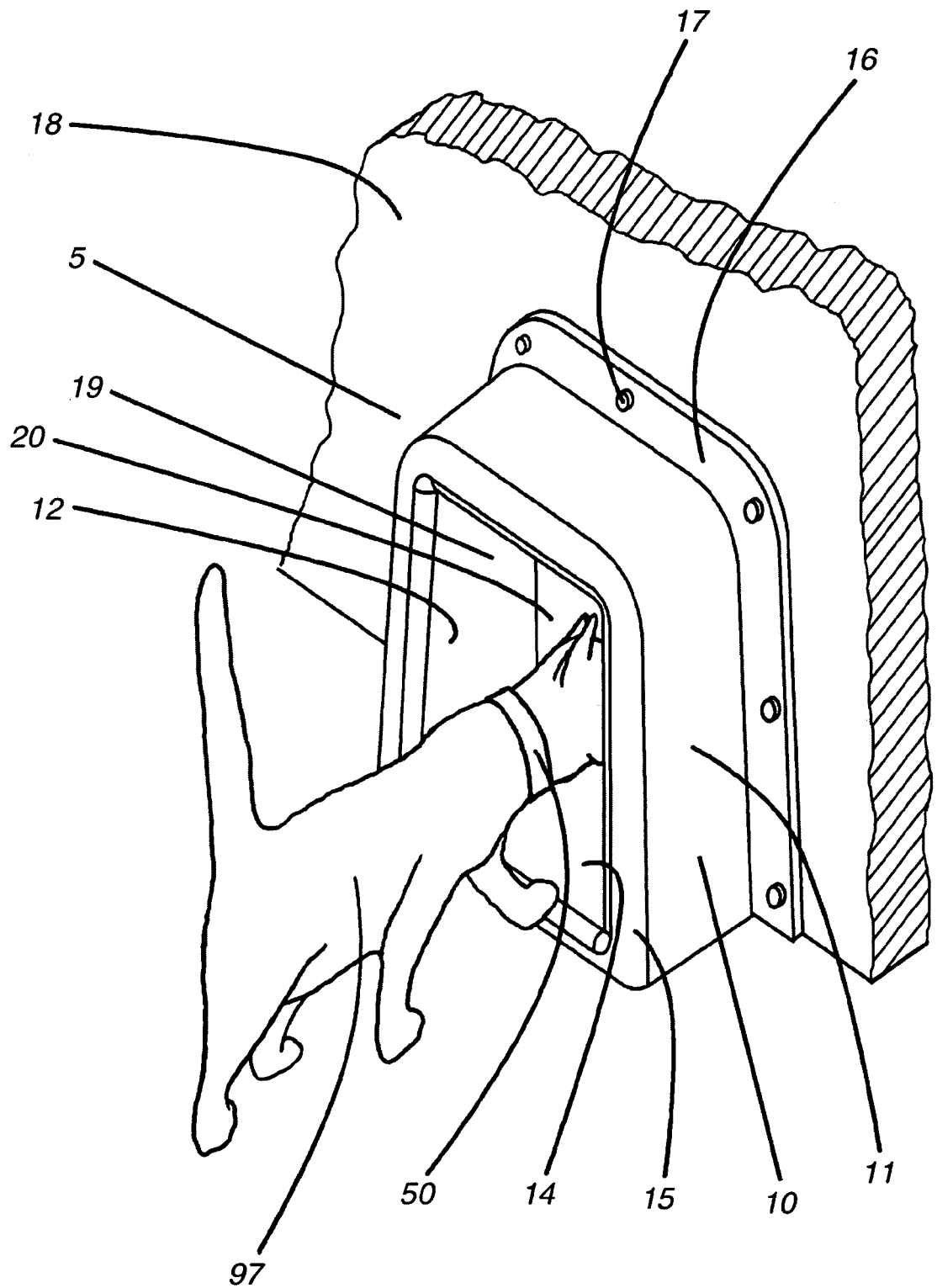
FIG. 1 is a perspective view of the entry control system.
Figure 2:
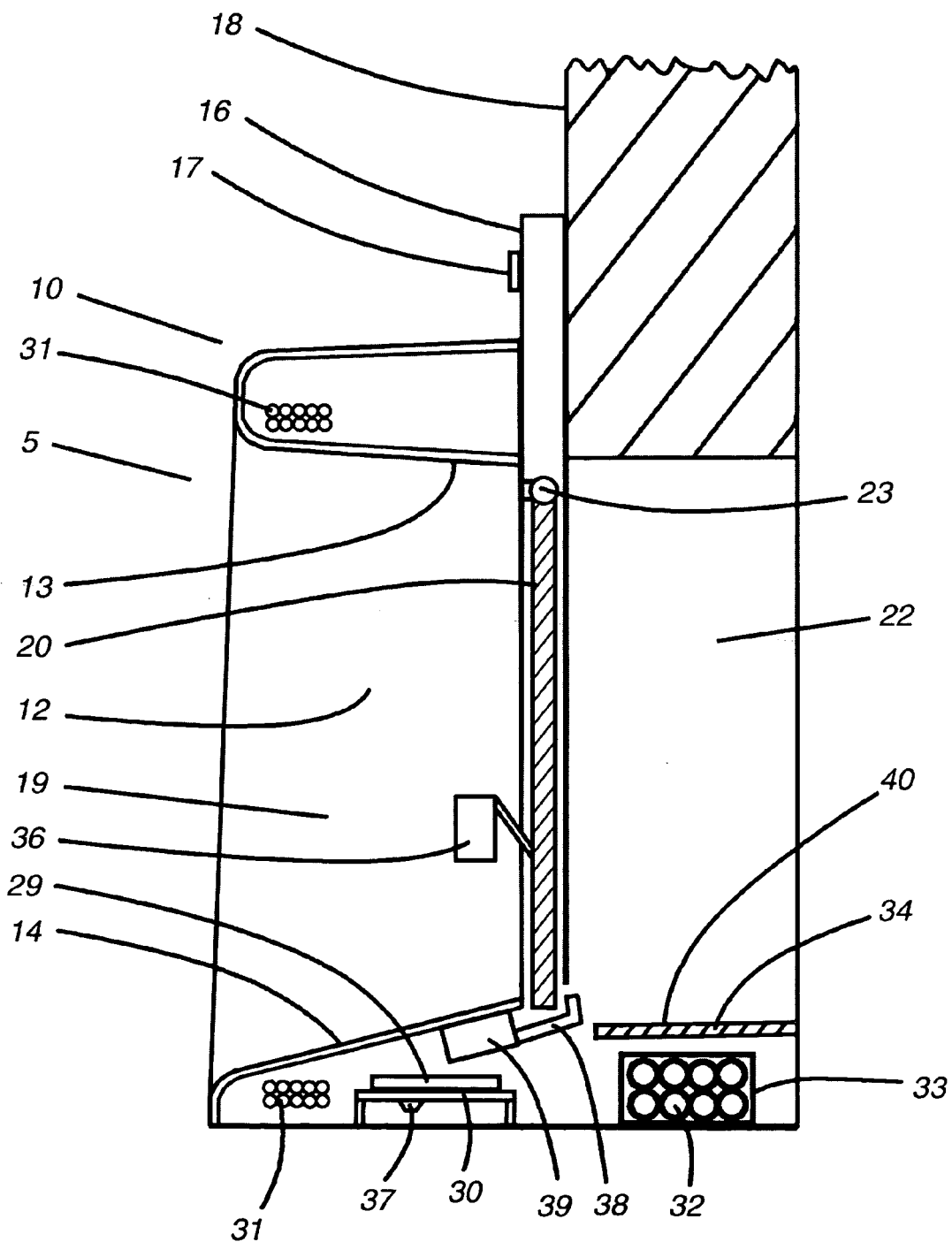
FIG. 2 is a side section view of the entry control system.
Figure 3:
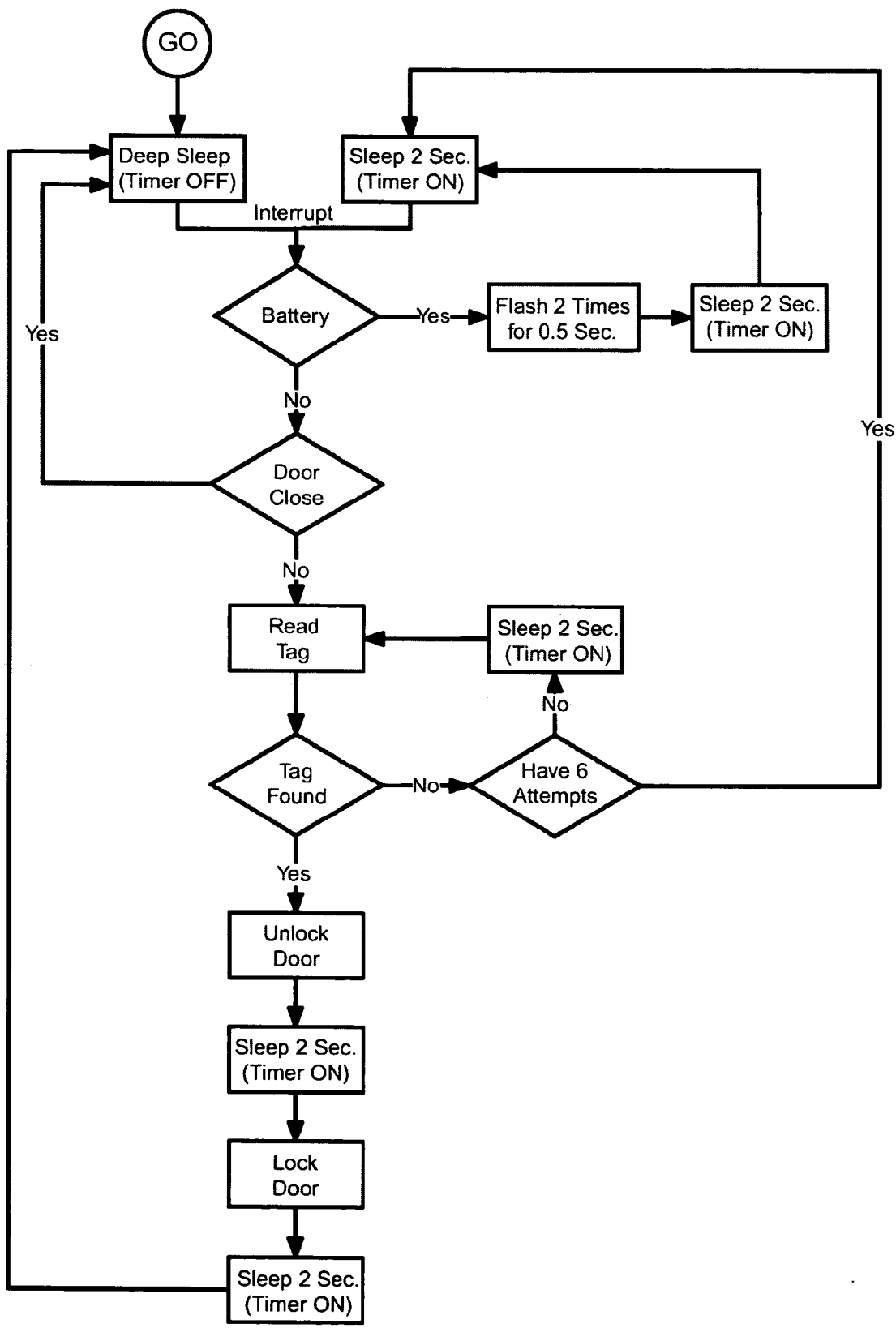
FIG. 3 is a flowchart of circuit function and system operation.
Figure 5:
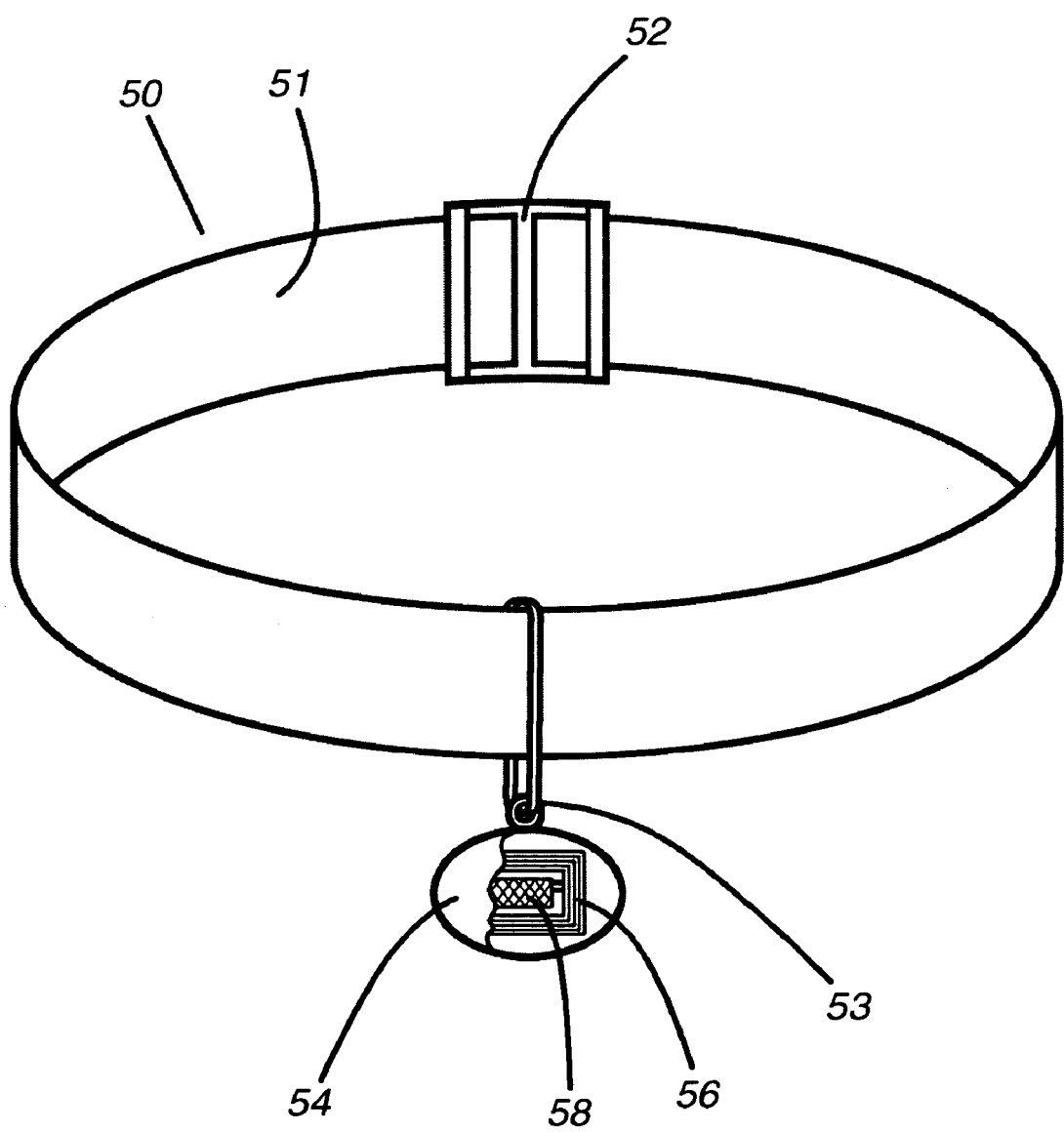
FIG. 5 is a detailed view of the animal collar and the attached RFID tag.

FIG. 1 depicts an illustrative embodiment of an entry control system 5, in accordance with the present invention. A bezel 10 is configured to surround an entryway 19 and a substantially vertical door 20 set into a boundary surface 18. This boundary surface 18 may be but is not limited to, an exterior wall, an interior wall, an exterior door, an interior door, a fence or a portion of an animal enclosure. The bezel 10 is preferably attached to the boundary surface 18 by a mounting flange 16 and fasteners 17, and is composed of a fascia 15 between outer walls 11 and inner walls 12, where portions of the inner walls 12 may serve as a floor surface 14 and a ceiling 13 as shown in FIG. 2. An aperture 22 has been cut into the boundary surface 18 for the door 20 to provide access therethrough. The bezel 10 is dimensioned such that only one animal 97 in the intended size range can fit inside the entryway 19 at once. In the preferred embodiment, the animal 97 is a domestic feline cat or a small dog and is wearing a collar 50, preferably of a standard animal collar style as illustrated in FIG. 5 with a collar band 51 and a collar fastener 52 for ease of attachment and removal, and an RFID tag element 54, preferably attached with an RFID tag fastener 53. The entry control system 5 can be dimensioned for use by animals either larger or smaller than domestic feline cats, too. If the animal 97 enters the bezel 10 and presses against the door 20, the resulting movement of the door 20 before being stopped by the door latch 38 causes closure of the door switch 36. This door switch 36 actuation triggers the "GO" input shown in FIG. 3, the flowchart of control board 30 containing control circuitry 29, and related component function.

Figure 4:
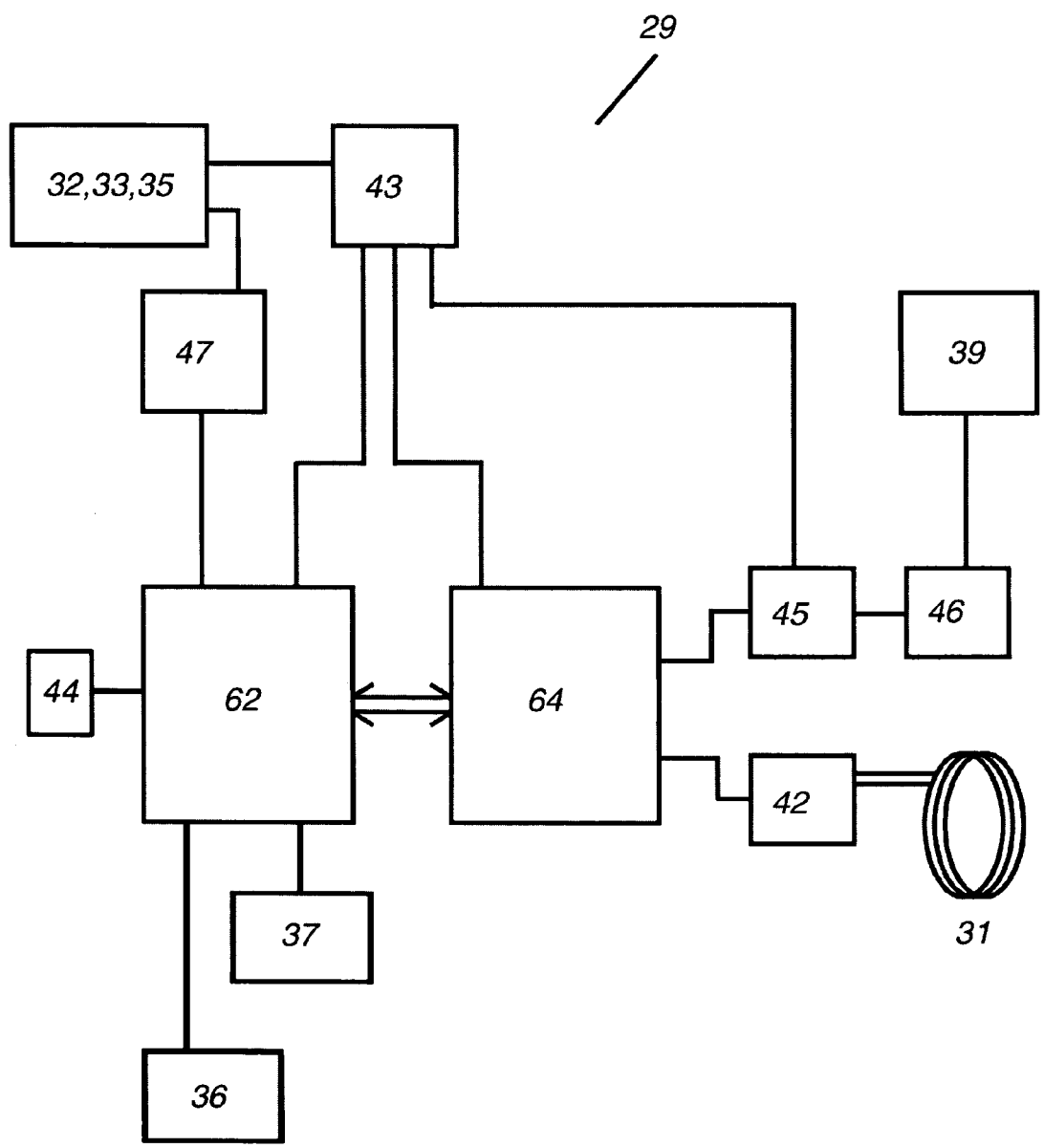
FIG. 4 is a block diagram of the circuit including the control and signal circuitry.

The system response to a door switch 36 closure is initially to activate and awaken the microcontroller 62 shown in FIG. 4 into the active state. The preferred first action by the awakened microcontroller 62 is to check the level of the batteries 32 using the circuit element DC Converter & Low Battery Comparator 47, which if the voltage of the batteries 32 is above the set Low Battery threshold, leads to checking the door 20 status. If the door 20 is still being pressed upon and thus the door switch 36 is still activated, then the microcontroller 62 will instruct the RFID module 64 to produce an interrogation signal that will be sent through the antenna connector 42 to be broadcast by the antenna coil 31. The combination of functions provided by the microcontroller 62, the RFID module 64 and the circuitry enabling them to function together provide the RFID sensor means required for the system.

If the animal 97 pressing against the door 20 is wearing a collar 50 with an RFID tag element 54 then the RFID antenna 56 will receive the interrogation signal and the interrogation signal will supply power to the RFID tag circuitry 58 and will be processed by the RFID tag circuitry 58 in such a fashion as to trigger a digital code output from an onboard memory register. The RFID tag circuitry 58 will then transmit this digital code back through the RFID antenna 56.

If the animal 97 is within the bezel 10 when the digital code is transmitted, then the antenna coil 31 will receive the digital code and transmit the digital code through the antenna connector 42 to the RFID module 64, where it will be compared with programmed codes stored in the RFID module 64 memory. If there is a match between a stored code and the digital code received from the RFID tag element 54, then the RFID module 64 will signal the microcontroller 62 to activate the solenoid drive circuitry 45 and through the solenoid connector 46 activate the solenoid 39 to unlock the door latch 38 and thus allow the animal 97 to push the door 20 open. The microcontroller 62 and related circuitry contain a means for timekeeping, and after some programmed time increment, the microcontroller 62 will deactivate the solenoid drive circuitry 45 and through the solenoid connector 46 deactivate the solenoid 39 and thus lock the door latch 38 so that if the door 20 is in the shut position or when the door 20 is returned to the shut position, it will re-lock. If there is then no closure detected of the door switch 36, the microcontroller 62 and the RFID module 64 will return to a sleep state and then to Deep Sleep as labeled in the flowchart of FIG. 3, this default operational state thus maximizing the conservation of battery life.

If the DC Converter & Low Battery Comparator 47 measures battery voltage below the Low Battery Threshold, a Low Battery LED 44 will flash periodically, thus alerting the need to change the batteries 32. The batteries 32 are held in a battery holder 33 that is preferably secured within the bezel 10 and accessed through the battery lid 34. In the preferred embodiment as shown in FIG. 2, the battery lid 34 may also serve as a portion of an aperture floor surface 40 inside the aperture 22. Here, the aperture floor surface 40 serves as an extended portion of the bezel 10. The batteries 32 are electrically connected to the circuitry of the control board 30 through the battery connector 35. Alternatively, the device may be powered from household AC, using a DC converter, or may be direct-wired into the household AC wiring, with appropriate onboard power conversion circuitry. Appropriate supply voltages for the microcontroller 62, the RFID module 64 and the other circuitry are provided through the voltage regulator 43.

The door 20 is preferably pivoted open by a door pivot 23 located at or near the top of the door 20 and connected to the bezel 10. Other door attachment and hinging mechanisms may be employed, but the use of gravity to close the door 20 produces a simple and economical mechanism. Alternative mechanisms using one or more springs may also be employed to yield a more forceful closure.

The unique identification codes of one or more RFID tag elements 54 may be programmed into the control circuitry 29 for recognition. An RFID tag element 54 is held near the antenna coil 31 and the programming button 37 is pressed.

This procedure may be repeated for as many RFID tag elements 54 as the RFID module 64 and the microcontroller 62 are capable of recognizing.

In addition to the entry control functions described above, there are other functions that can be programmed into the control circuitry 29. One optional function is a timer implemented in either hardware, software or a combination of both, that is designed to be programmed by the animal owner to only allow access through the door during set times, where different set permitted entry times can be programmed for each different animal wearing an RFID tag element. Optionally, this timer function may be used in place of the RFID sensing system as a method of controlling entry through the doorway.

Another optional function allows the storage and display of access information, thus enabling the animal owner to have a record of when and how often the door switch 36 has been actuated and how often each animal has passed through the doorway.

Yet another optional function allows the entry control system to be programmed to only allow a set number of accesses for each recognized RFID tag element 54 per day.

An alternate embodiment of the door switch 36 is located beneath a portion of the bezel floor 14, and the switch is configured to actuate from the weight of an animal treading upon the floor surface.

An alternate method of securing the RFID tag element 54 to an animal is to use well-known permanent physical attachments including but not limited to ear tags. A further alternate method of securing the RFID tag element 54 to an animal is to implant the RFID tag element 54 within the body of an animal.

An alternate embodiment of the RFID-enabled animal identification and entry control invention may be used to control entrance to an enclosed animal feeder, allowing only selected animals to access the feeder contents, and optionally only at times, intervals or with frequency of access set by the owner.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. An animal electronic identification and entry control device comprising:
    a mounting flange for securing said entry control device to a boundary surface selected from the group consisting of a wall, door, fence or a portion of an animal enclosure;
    an aperture adapted to be cut into said boundary surface, said aperture further adapted to permit passage by an animal therethrough;
    said mounting flange substantially surrounding a perimeter of said aperture;
    a bezel mechanically joined to said mounting flange and substantially surrounding said aperture, said bezel extending outwardly from and substantially transversely to said aperture, an interior volume of said bezel thus defining an entryway leading into said aperture;
    said entryway adapted for use by animals and dimensioned for entry by only one animal at a time;
    a door pivotally attached within said entry control device in proximity to said aperture, said door having a closed position blocking said aperture;
    locking means for locking and unlocking said door and operable between a locked condition and an unlocked condition, said locking means, with said door closed, operable to a locked position and, with said lock in an unlocked condition enabling said door to be opened; and
    radio frequency identification (RFID) sensor means adapted for cooperative functioning with an RFID-tagged animal, said RFID sensor means actuating said locking means thereby adapted to permit access through said aperture by said RFID-tagged animal.

2. The entry control device as set forth in claim 1 wherein said device is adapted to control animal access to a human dwelling.

3. The entry control device as set forth in claim 1 wherein said device is adapted to control animal access to an animal dwelling.

4. The entry control device as set forth in claim 1 wherein said RFID sensor means includes at least one antenna element positioned forward of said aperture and in proximity to said entryway.

5. The entry control device as set forth in claim 4 wherein said antenna element is formed in at least one loop configured to circumferentially surround a portion of said entryway.

6. The entry control device as set forth in claim 1 wherein:
    said entryway includes a first end defined by said aperture and a second end opposite said first end;
    said door includes an inward surface substantially facing away from said second end and an outward surface substantially facing towards said second end;
    a switch in mechanical communication with said door, said switch actuated by pressure against said outward surface of said door, said switch further in electrical communication with said RFID sensor means;
    wherein at least a portion of said RFID sensor means further has at least two operational states wherein a first operational state is a minimum-power sleep state and a second operational state is an active state enabling full function of said RFID sensor means;
        wherein a default operational state of said RFID sensor means is said minimum-power sleep state thereby providing minimum power consumption for said system; and
    wherein said RFID sensor means is further configured such that if said switch is actuated then said RFID sensor means is brought out of said minimum power sleep state into said active state, said RFID sensor means further including timekeeping means such that after an increment of time from an event such as the actuation of said switch, said RFID sensor means returns to said minimum power sleep state, thereby conserving power.

7. The entry control device as set forth in claim 6 wherein said RFID sensor means includes storage and display means for the data associated with each actuation of said switch and subsequent activity of said RFID sensor means.

8. The entry control device as set forth in claim 6 wherein said bezel includes a floor surface; and
    wherein said switch is in mechanical communication with at least a portion of said floor surface, said switch adapted to actuate from the weight of an animal treading upon said floor surface.

9. The entry control device as set forth in claim 1 wherein said RFID sensor means includes programming means enabling said RFID sensor means to be adapted for cooperative functioning with at least one chosen RFID-tagged animal.

10. The entry control device as set forth in claim 1 wherein said RFID sensor means is adapted for cooperative functioning with multiple chosen RFID-tagged animals.

11. The entry control device as set forth in claim 10 wherein said RFID sensor means includes programming means adapted for cooperative functioning with multiple chosen RFID-tagged animals at different programmed times.

12. The entry control device as set forth in claim 1 wherein said locking means comprises a latch in mechanical communication with said door and a solenoid in mechanical communication with said latch; and
wherein said RFID sensor means further includes solenoid actuating means.

13. The entry control device as set forth in claim 1 wherein said RFID sensor means further comprises a power source consisting of at least one battery.

14. The entry control device as set forth in claim 13 wherein said power source is adapted to be permanently electrically wired into the local AC electrical supply system.

15. An animal electronic identification and entry control device comprising:
a mounting flange for securing said entry control device to a boundary surface selected from the a group consisting of a wall, door, fence or a portion of an animal enclosure;
an aperture adapted to be cut into said boundary surface, said aperture further adapted to permit passage by an animal therethrough;
said mounting flange substantially surrounding a perimeter of said aperture;
a bezel mechanically joined to said mounting flange and substantially surrounding said aperture, said bezel extending outwardly from and substantially transversely to said aperture, an interior volume of said bezel thus defining an entryway leading into said aperture;
said entryway adapted for use by animals and dimensioned for entry by only one animal at a time, said entryway including a first end defined by said aperture and a second end opposite said first end;
a door pivotally attached within said entry control device in proximity to an upper boundary of said aperture, said door having as a closed position a substantially vertical rest position substantially blocking said aperture, said door upwardly and inwardly pivotable away from said entryway if unlocked and pressed upon from said outward side;
a latch in mechanical communication with said door and operable between a locked condition and an unlocked condition, said latch, with said door closed, operable to a locked position and, with said latch in an unlocked condition enabling said door to be opened;
a solenoid in mechanical communication with said latch, said solenoid operating said latch between a locked condition and an unlocked condition;
radio frequency identification (RFID) sensor means adapted for cooperative functioning with an RFID-tagged animal, said RFID sensor means actuating said solenoid thereby adapted to permit access through said aperture by said RFID-tagged animal;
said RFID sensor means further including at least one antenna element, said antenna element positioned forward of said aperture and in proximity to said entryway and formed in at least one loop configured to circumferentially surround a portion of said entryway;
a switch in mechanical communication with said door, said switch actuated by pressure against said outward surface of said door, said switch further in electrical communication with said RFID sensor means;
wherein at least a portion of said RFID sensor means further has at least two operational states wherein a first operational state is a minimum-power sleep state and a second operational state is an active state enabling full function of said RFID sensor means;
wherein a default operational state of said RFID sensor means is said minimum-power sleep state thereby providing minimum power consumption for said entry control device;
wherein said RFID sensor means is further configured such that if said switch is actuated then said RFID sensor means is brought out of said minimum power sleep state into said active state, said RFID sensor means further including timekeeping means such that after an increment of time from an event such as the actuation of said switch, said RFID sensor means returns to said minimum-power sleep state, thereby conserving power.

16. An animal electronic identification and entry control system having electronic identification and feed control comprising:
a mounting flange for securing said entry control system to a boundary surface selected from the group consisting of a wall, door, fence or a portion of an animal enclosure;
an aperture adapted to be cut into said boundary surface, said aperture further adapted to permit passage by an animal therethrough;
said mounting flange substantially surrounding a perimeter of said aperture;
a bezel mechanically joined to said mounting flange and substantially surrounding said aperture, said bezel extending outwardly from and substantially transversely to said aperture, an interior volume of said bezel thus defining an entryway leading into said aperture;
said entryway adapted for use by animals and dimensioned for entry by only one animal at a time;
a door pivotally attached within said entry control system in proximity to said aperture, said door having a closed position blocking said aperture;
locking means for locking and unlocking said door and operable between a locked condition and an unlocked condition, said locking means, with said door closed, operable to a locked position and, with said lock in an unlocked condition enabling said door to be opened;
a feeding chamber accessed through said door;
at least one radio frequency identification (RFID) tag element adapted for use with animals; and
radio frequency identification (RFID) sensor means adapted for cooperative functioning with an RFID-tagged animal, said RFID sensor means actuating said locking means thereby adapted to permit access to said feeding chamber by said RFID-tagged animal.

17. The animal electronic identification and entry control system as set forth in claim 16 wherein said system is adapted for use by domestic feline cats or small dogs.

18. The animal electronic identification and entry control system as set forth in claim 16 wherein said RFID sensor means includes at least one antenna element positioned forward of said aperture and in proximity to said entryway, thereby providing electronic communications means with said RFID tag element when said RFID tag element is present within said entryway.

19. The animal electronic identification and entry control system as set forth in claim 18 wherein said antenna element is formed in at least one loop configured to circumferentially surround a portion of said entryway.

20. The animal electronic identification and entry control system as set forth in claim 16 wherein said RFID sensor means includes programming means enabling said RFID sensor means to be adapted for cooperative functioning with at least one of said RFID tag elements adapted for use with animals.

21. The animal electronic identification and entry control system as set forth in claim 16 wherein said RFID sensor means is adapted for cooperative functioning with multiple chosen RFID tag elements adapted for use with animals.

22. The animal electronic identification and entry control system as set forth in claim 21 wherein said RFID sensor means includes programming means adapted for cooperative functioning at different programmed times with multiple chosen RFID tag elements adapted for use with animals.

* * * * *